United States Patent [19]
Amagai et al.

[11] Patent Number: 6,117,923
[45] Date of Patent: Sep. 12, 2000

[54] RESIN FOR OPTICAL MATERIAL

[75] Inventors: Akikazu Amagai; Masanori Shimuta; Motoharu Takeuchi; Katsuyuki Mizuno, all of Tokyo, Japan

[73] Assignee: Mitsubishi Gas Chemical Company, Inc., Tokyo, Japan

[21] Appl. No.: 09/063,258

[22] Filed: Apr. 20, 1998

[30] Foreign Application Priority Data

Apr. 22, 1997 [JP] Japan ................................. 9-104724

[51] Int. Cl.⁷ .......................... C08G 59/22; C08G 59/30; C08G 59/32; C08G 59/66
[52] U.S. Cl. .......................... 523/440; 523/456; 523/461; 528/377; 528/374; 528/406
[58] Field of Search .................... 523/440, 456, 523/461; 528/377, 374, 406

[56] References Cited

U.S. PATENT DOCUMENTS

| | | | |
|---|---|---|---|
| 5,369,141 | 11/1994 | Coleman et al. | 523/106 |
| 5,374,668 | 12/1994 | Kanemura et al. | 523/451 |
| 5,548,026 | 8/1996 | Jorissen et al. | 525/113 |
| 5,807,975 | 9/1998 | Amagai et al. | 528/373 |

*Primary Examiner*—Robert Dawson
*Assistant Examiner*—Kuo-Liang Peng
*Attorney, Agent, or Firm*—Frishauf, Holtz, Goodman, Langer & Chick, P.C.

[57] ABSTRACT

A resinous composition which comprises a compound having, in one molecule, one or more structures of the formula (1)

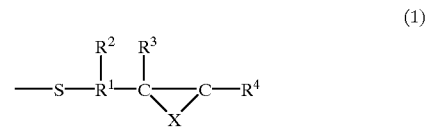

(1)

wherein $R^1$ is a hydrocarbon having 1 to 10 carbon atoms; $R^2$, $R^3$ and $R^4$ are each hydrogen or a hydrocarbon group having 1 to 10 carbon atoms; and X is S or O, and a ratio of S to the total of S and O constituting the three-membered ring is 50% or more on the average; and another compound having one or more SH groups in one molecule. The resinous composition can be used for an optical material having improved oxidation resistance.

17 Claims, No Drawings

RESIN FOR OPTICAL MATERIAL

BACKGROUND OF THE INVENTION (1) Field of the Invention

The present invention relates to a novel resin which can suitably be used as any of optical materials such as plastic lenses, prisms, optical fibers, information recording substrates and filters, among others, as a material for plastic lenses of spectacles.

(2) Description of the Prior Art

In recent years, many plastic materials have been used as various kinds of optical materials, particularly as spectacle lenses, because they are light-weight, tough and easily dyeable. The optical materials, particularly the spectacle lenses are required to possess a low specific gravity as well as a high refractive index and a high Abbe's number as optical performances, and a high heat resistance and a high strength as physical performances. The high refractive index permits the decrease in a lens thickness, and the high Abbe's number can reduce a chromatic aberation of the lenses. In addition, the high heat resistance and the high strength facilitate the fabrication of the lenses, and they are important from the viewpoint of safety.

As conventional materials having the high refractive index, there have been suggested thermosetting optical materials having thiourethane structures obtained by reactions of polythiol compounds with polyisocyanate compounds (Japanese Patent Publication No. 58489/1992 and Japanese Patent Application Laid-open No. 148340/1993). In addition, other techniques, by which an epoxy resin or an episulfide resin is polymerized with a compound having two or more functional groups to obtain lenses, have also been suggested in Japanese Patent Application Laid-open Nos. 10 98615/1989 and 81320/1991 as well as WO 8910575. However, it is natural that a higher refractive index should be desirable. On the other hand, another important performance required for the optical material is that a chromatic aberation is low. Since the higher the Abbe's number is, the lower the chromatic aberation is, i.e., the better the chromatic aberation is, a material having the high Abbe's number is desired. That is to say, the simultaneous realization of the high refractive index and the high Abbe's number is also desired.

However, the Abbe's number usually tends to lower with an increase in the refractive index, and in a plastic material obtained from a conventional compound as a starting material, the Abbe's number is in the range of about 50 to 55 in the case that the refractive index is in the range of 1.50 to 1.55; it is 40 in the case of a refractive index of 1.60; it is about 31 which is a limit value in the case of a refractive index of 1.66; and it is about 30 or less in the case that it is forcedly attempted to achieve a refractive index of 1.7, and material having such a low Abbe's number is not practical any more.

In addition, in the case of the conventional technique, particularly in the case of a thiourethane material or the like, in order to express the high refractive index, it is necessary to increase the molecular weight of a raw material sulfur compound, so that a crosslink density deteriorates. Moreover, in order to express the high Abbe's number, it is necessary to increase an alkyl group content, so that the stiffness of the molecule constituting the raw material compound deteriorates, with the result that the heat resistance deteriorates inconveniently. That is to say, in the optical materials obtained from episulfide compounds, polythiol compounds and isocyanate compounds by the conventional technique, the increase in the refractive index is limited, and what is worse, the increase in the refractive index leads to the deterioration of the Abbe's number. In consequence, a suitable balance between the sufficiently high refractive index and refractive index has not been obtained so far.

For the purpose of solving the above-mentioned problems, the present inventors have found novel sulfur-containing compounds having an episulfide structure which permits the production of optical materials having a small thickness and a low chromatic aberation, and there have already been filed patent applications regarding the novel compounds (Japanese Patent Application Nos. 214631/1996 and 5797/1997). However, the optical materials obtained by polymerizing the sulfur-containing compounds cannot have a sufficiently satisfactory oxidation resistance, so that they tend to easily discolor during a long-term storage and in a process requiring a heat treatment.

SUMMARY OF THE INVENTION

An object of the present invention is to improve the oxidation resistance of a resin obtained by polymerizing a novel sulfur-containing compound having an episulfide structure which have already been found by the present inventors.

The present inventors have intensively investigated on a technique for overcoming the above-mentioned drawbacks, and as a result, it has been found that a resin having an excellent oxidation resistance can be obtained by polymerizing a resinous composition which comprises (a) a compound having, in one molecule, one or more of structures represented by the formula (1)

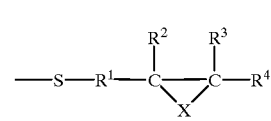

(1)

wherein $R^1$ is a hydrocarbon having 1 to 10 carbon atoms; $R^2$, $R^3$ and $R^4$ are each hydrogen or a hydrocarbon group having 1 to 10 carbon atoms; and X is S or O, and an existing ratio of S is 50% or more on the average with respect to the total of S and O constituting a three-membered ring, and (b) a compound having one or more SH groups in one molecule, a ratio of the total mol number of the SH group in the compound (b) to the total mol number of an episulfide group and/or an epoxy group in the compound (a) being in the range of 0.001 to 0.5. In consequence, the present invention has been completed.

DETAILED DESCRIPTION OF THE INVENTION

In the present invention, a molar ratio of the total of an SH group in a compound (b) to the total of an episulfide group and/or an epoxy group in a compound (a) is usually in the range of 0.001 to 0.5, preferably 0.001 to 0.3, more preferably 0.001 to 0.2, most preferably 0.01 to 0.1. If the molar ratio of the total of the SH group in the compound (b) to the total of the episulfide group and/or the epoxy group in the compound (a) is more than 0.5, the heat resistance of an optical material obtained by polymerizing the composition is so poor that the obtained optical material is not practical, and on the other hand, if it is less than 0.001, a high oxidation resistance which is intended by the present invention cannot be satisfied.

In order to express the high refractive index which is one of the main themes of the present invention, $R^1$ in the formula (1) is preferably methylene or ethylene, and $R^2$, $R^3$ and $R^4$ in the formula (1) are preferably each hydrogen or methyl. In a more preferable case, $R^1$ is methylene, and $R^2$, $R^3$ and $R^4$ are all hydrogen. Furthermore, an existing ratio of S in the formulae (1) and (2) is preferably 90% or more, more preferably 95% or more, most preferably substantially 100% on the average to the total of S and O constituting a three-membered ring.

Examples of the compound (a) of the present invention having one or more of structures represented by the formula (1) in one molecule are as follows.

(I) Examples of the compound having one of the structures represented by the formula (1) in one molecule include bis(β-epithiopropyl)sulfide and other bis(β-epithiopropyl)sulfides in which at least one hydrogen of an episulfide group is replaced with a methyl group.

(II) Examples of the compound having two or more of the structures represented by the formula (1) in one molecule include (A) organic compounds having a chain aliphatic skeleton to which two or more of the structures represented by the formula (1) are bonded, (B) organic compounds having a cyclic aliphatic skeleton to which two or more of the structures represented by the formula (1) are bonded, (C) organic compounds having an aromatic skeleton to which two or more of the structures represented by the formula (1) are bonded, and each of these compounds may contain a bond of a sulfide, an ether, a sulfone, a ketone, an ester or the like in its molecule.

The organic compounds having the chain aliphatic skeleton in the group (A) can be classified into straight-chain compounds and branched compounds, and all of them are acceptable. Particularly preferable examples of these organic compounds include straight-chain compounds represented by the following formula (2)

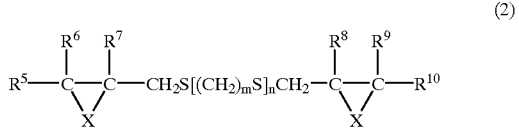

(2)

wherein $R^5$ to $R^{10}$ are each hydrogen or a hydrocarbon group having 1 to 10 carbon atoms; and x is S or O, and an existing ratio of S is 50% or more on the average with respect to the total of S and O constituting a three-membered ring; m is 1 to 6; and n is 0 to 4.

Typical examples of these preferable organic compounds include chain organic compounds such as bis(β-epithiopropylthio)methane, 1,2-bis(β-epithiopropylthio) ethane, 1,3-bis(β-epithiopropylthio)propane, 1,2-bis(β-epithiopropylthio)propane, 1-(β-epithiopropylthio)-2-(β-epithiopropylthiomethyl)propane, 1,4-bis(β-epithiopropylthio)butane, 1,3-bis(β-epithiopropylthio) butane, 1-(β-epithiopropylthio)-3-(β-epithiopropylthiomethyl)butane, 1,5-bis(β-epithiopropylthio)pentane, 1-(β-epithiopropylthio)-4-(β-epithiopropylthiomethyl)pentane, 1,6-bis(β-epithiopropylthio)hexane, 1-(β-epithiopropylthio)-5-(β-epithiopropylthiomethyl)hexane, 1-(β-epithiopropylthio)-2-[(2-β-epithiopropylthioethyl)thio]ethane, 1-(β-epithiopropylthio)- 2-[{2-(2-β-epithiopropylthioethyl) thioethyl}thio]ethane, branched organic compounds such as tetrakis(β-epithiopropylthiomethyl)methane, 1,1,1-tris(β-epithiopropylthiomethyl)propane, 1,5-bis(β-epithiopropylthio)-2-(β-epithiopropylthiomethyl)-3-thiapentane, 1,5-bis(β-epithiopropylthio)-2,4-bis(β-epithiopropylthiomethyl)-3-thiapentane, 1-(β-epithiopropylthio)-2,2-bis(β-epithiopropylthiomethyl)-4-thiahexane, 1,5,6-tris(β-epithiopropylthio)-4-(β-epithiopropylthiomethyl)-3-thiahexane, 1,8-bis(β-epithiopropylthio)-4-(β-epithiopropylthiomethyl)-3,6-dithiaoctane, 1,8-bis(β-epithiopropylthio)-4,5-bis(β-epithiopropylthiomethyl)-3,6-dithiaoctane, 1,8-bis(β-epithiopropylthio)-4,4-bis(β-epithiopropylthiomethyl)-3,6-dithiaoctane, 1,8-bis(β-epithiopropylthio)-2,4,5-tris(β-epithiopropylthiomethyl)-3,6-dithiaoctane, 1,8-bis(β-epithiopropylthio)-2,5-bis(β-epithiopropylthiomethyl)-3,6-dithiaoctane, 1,9-bis(β-epithiopropylthio)-5-(β-epithiopropylthiomethyl)-5-[(2-β-epithiopropylthioethyl) thiomethyl]-3,7-dithianonane, 1,10-bis(β-epithiopropylthio)-5,6-bis[(2-β-epithiopropylthioethyl) thio]-3,6,9-trithiadecane, 1,11-bis(β-epithiopropylthio)-4,8-bis(β-epithiopropylthioethyl)-3,6,9-trithiaundecane, 1,11-bis(β-epithiopropylthio)-5,7-bis(β-epithiopropylthiomethyl)-3,6,9-trithiaundecane, 1,11-bis(β-epithiopropylthio)-5,7-[(2-β-epithiopropylthioethyl)-3,6,9-trithiaundecane, 1,11-bis(β-epithiopropylthio)-4,7-bis(β-epithiopropylthiomethyl)-3,6,9-trithiaundecane, and these compounds in which at least one hydrogen of an episulfide group is replaced with a methyl group.

Typical examples of the preferable organic compounds (B) having the cyclic aliphatic skeleton include cyclic aliphatic organic compounds such as 1,3- and 1,4-bis(β-epithiopropylthio)cyclohexane, 1,3- and 1,4-bis(β-epithiopropylthiomethyl)cyclohexane, bis[4-(β-epithiopropylthio)cyclohexyl]methane, 2,2-bis[4-(β-epithiopropylthio)cyclohexyl]propane, bis[4-(β-epithiopropylthio)cyclohexyl]sulfide, 2,5-bis(β-epithiopropylthiomethyl)-1,4-dithian, 2,5-bis(β-epithiopropylthioethylthiomethyl)-1,4-dithian, and these compounds in which at least one hydrogen of an episulfide group is replaced with a methyl group.

Typical examples of the preferable organic compounds (C) having the aromatic skeleton include aromatic organic compounds such as 1,3- and 1,4-bis(β-epithiopropylthio) benzene, 1,3- and 1,4-bis(β-epithiopropylthiomethyl) benzene, bis[4-(β-epithiopropylthio)phenyl]methane, 2,2-bis[4-(β-epithiopropylthio)phenyl]propane, bis[4-(β-epithiopropylthio)phenyl]sulfide, bis[4-(β-epithiopropylthio)phenyl]sulfone and 4,4'-bis(β-epithiopropylthio)biphenyl, and these compounds in which at least one hydrogen of an episulfide group is replaced with a methyl group. However, these compounds are not restrictive, and they may be used singly or in the state of a mixture two or more thereof. The most preferable compound is bis(β-epithiopropyl)sulfide.

Examples of the compound (b) having one or more SH groups of the present invention include mercaptans and thiophenols as well as mercaptans and thiophenols having unsaturated groups such as a vinyl group, an aromatic vinyl group, a methacrylic group, an acrylic group and an allyl group.

Typical examples of the mercaptans include mono-mercaptans such as methyl mercaptan, ethyl mercaptan, n-propyl mercaptan, n-butyl mercaptan, allyl mercaptan, n-hexyl mercaptan, n-octyl mercaptan, n-decyl mercaptan, n-dodecyl mercaptan, n-tetradecyl mercaptan, n-hexadecyl mercaptan, n-octadecyl mercaptan, cyclohexyl mercaptan, isopropyl mercaptan, tert-butyl mercaptan, tert-nonyl mercaptan, tert-dodecyl mercaptan, benzyl mercaptan, 4-chlorobenzyl mercaptan, methyl thioglycolate, ethyl thioglycolate, n-butyl thioglycolate, n-octyl thioglycolate, methyl(3-mercaptopropionate), ethyl(3-mercaptopropionate), 3-methoxybutyl(3-mercaptopropionate), n-butyl(3-mercaptopropionate), 2-ethylhexyl(3-mercaptopropionate) and n-octyl(3-mercaptopropionate), and polymercaptans such as methanedithiol, 1,2-dimercaptoethane, 1,2-dimercaptopropane, 2,2-dimercaptopropane, 1,3-dimercaptopropane, 1,2,3-trimercaptopropane, 1,4-dimercaptobutane, 1,6-dimercaptohexane, bis(2-mercaptoethyl)sulfide, 1,2-bis(2-mercaptoethylthio)ethane, 1,5-dimercapto-3-oxapentane, 1,8-dimercapto-3,6-dioxaoctane, 2,2-dimethylpropane-1,3-dithiol, 3,4-dimethoxybutane-1,2-dithiol, 2-mercaptomethyl-1,3-dimercaptopropane, 2-mercaptomethyl-1,4-dimercaptobutane, 2-(2-mercaptoethylthio)-1,3-dimercaptopropane, 1,2-bis(2-mercaptoethylthio)-3-mercaptopropane, 1,1,1-tris(mercaptomethyl)propane, tetrakis(mercaptomethyl)methane, ethylene glycol bis(2-mercaptoacetate), ethylene glycol bis(3-mercaptopropionate), 1,4-butanediolbis(2-mercaptoacetate), 1,4-butanediolbis(3-mercaptopropionate), trimethylolpropanetris(2-mercaptoacetate), trimethylolpropanetris(3-mercaptopropionate), pentaerythritoltetrakis(2-mercaptoacetate), pentaerythritoltetrakis(3-mercaptoacetate), 1,1-dimercaptocyclohexane, 1,4-dimercaptocyclohexane, 1,3-dimercaptocyclohexane, 1,2-dimercaptocyclohexane, 1,4-bis(mercaptomethyl)cyclohexane, 1,3-bis(mercaptomethyl)cyclohexane, 2,5-bis(mercaptomethyl)-1,4-dithian, 2,5-bis(2-mercaptoethyl)-1,4-dithian, 2,5-bis(mercaptomethyl)-1-thian, 2,5-bis(2-mercaptoethyl)-1-thian, 1,4-bis(mercaptotophenyl)sulfide, bis(4-mercaptophenyl)ether, 2,2-bis(4-mercaptophenyl)propane, bis(4-mercaptomethylphenyl)sulfide, bis(4-mercaptomethylphenyl) ether, 2,2-bis(4-mercaptomethylphenyl)propane, 2,5-dimercapto-1,3,4-thiadiazole and 3,4-thiophedithiol.

Furthermore, the mercaptans and thiophenols having the unsaturated group will concretely be mentioned as follows.

Examples of the mercaptans having the unsaturated group include allyl mercaptan, 2-vinylbenzyl mercaptan, 3-vinylbenzyl mercaptan and 4-vinylbenzyl mercaptan.

Examples of the thiophenols having the unsaturated group include 2-vinylthiophenol, 3-vinylthiophenol and 4-vinylthiophenol.

From the viewpoint of the heat resistance, the preferable compounds are the mercaptans and the thiophenols. They can be used singly or in the state of a mixture of two or more thereof.

The composition of the present invention can be heated and polymerized in the presence or absence of a polymerizing catalyst to prepare a resin. A preferable method uses the polymerizing catalyst, and examples of a polymerizing catalyst include amines, phosphines, mineral acids, Lewis acids, organic acids, silicic acids and fluoroboric acid.

Typical examples of the polymerizing catalyst include
(1) amine compounds typified by primary amines such as ethylamine, n-propylamine, sec-propylamine, n-butylamine, sec-butylamine, iso-butylamine, tert-butylamine, pentylamine, hexylamine, heptylamine, octylamine, decylamine, laurylamine, myristylamine, 1,2-dimethylhexylamine, 3-pentylamine, 2-ethylhexylamine, allyamine, aminoethanol, 1-aminopropanol, 2-aminopropanol, aminobutanol, aminopentanol, aminohexanol, 3-ethoxypropylamine, 3-propoxypropylamine, 3-isopropoxypropylamine, 3-butoxypropylamine, 3-isobutoxypropylamine, 3-(2-ethylhexyloxy)propylamine, aminocyclopentane, aminocyclohexane, aminonorbornene, aminomethylcyclohexane, aminobenzene, benzylamine, phenethylamine, β-phenylethylamine, naphthylamine and furfurylamine; primary polyamines such as ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, dimethylaminopropylamine, diethylaminopropylamine, bis(3-aminopropyl)ether, 1,2-bis(3-aminopropoxy)ethane, 1,3-bis(3-aminopropoxy)-2,2'-dimethylpropane, aminoethylethanolamine, 1,2-, 1,3- and 1,4-bisaminocyclohexane, 1,3- and 1,4-bisaminomethylcyclohexane, 1,3- and 1,4-bisaminoethylcyclohexane, 1,3- and 1,4-bisaminopropylcyclohexane, hydrogenated 4,4'-diaminodiphenylmethane, 2- and 4-aminopiperidine, 2- and 4-aminomethylpiperidine, 2- and 4-aminoethylpiperidine, N-aminoethylpiperidine, N-aminopropylpiperidine, N-aminoethylmorpholine, N-aminopropylmorpholine, isophoronediamine, methanediamine, 1,4-bisaminopropylpiperazine, o-, m- and p-phenylenediamine, 2,4- and 2,6-tolylenediamine, 2,4-toluenediamine, m-aminobenzylamine, 4-chloro-o-phenylenediamine, tetrachloro-p-xylylenediamine, 4-methoxy-6-methyl-m-phenylenediamine, m- and p-xylylenediamine, 1,5- and 2,6-naphthalenediamine, benzidine, 4,4'-bis(o-toluidine), dianisidine, 4,4'-diaminodiphenylmethane, 2,2-(4,4'-diaminodiphenyl)propane, 4,4'-diaminodiphenyl ether, 4,4'-thiodianiline, 4,4'-diaminodiphenylsulfone, 4,4'-diaminoditolylsulfone, methylenebis(o-chloroaniline), 3,9-bis(3-aminopropyl)-2,4,8,10-tetraoxaspiro[5.5]undecane, diethyltriamine, iminobispropylamine, methyliminobispropylamine, bis(hexamethylene)triamine, triethylenetetramine, tetraethylenepentamine, pentaethylenehexamine, N-aminoethylpiperazine, N-aminopropylpiperazine, 1,4-bis(aminoethylpiperazine), 1,4-bis(aminopropylpiperazine), 2,6-diaminopyridine and bis(3,4-diaminophenyl)sulfone; secondary amines such as diethylamine, dipropylamine, di-n-butylamine, di-secbutylamine, diisobutylamine, di-n-pentylamine, di-3-pentylamine, dihexylamine, octylamine, di(2-ethylhexyl)amine, methylhexylamine, diallylamine, pyrrolidine, piperidine, 2-, 3- and 4-picoline, 2,4-, 2,6- and 3,5-lupetidine, diphenylamine, N-methylaniline, N-ethylaniline, dibenzylamine, methylbenzylamine, dinaphthylamine, pyrrole, indoline, indole and morpholine; secondary polyamines such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N,N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'- diethyl-1,6-diaminohexane, piperazine, 2-methylpiperazine, 2,5- and 2,6-dimethylpiperazine, homopiperazine, 1,1-di-(4-piperidyl)methane, 1,2-di-(4-piperidyl)ethane, 1,3-di-(4-piperidyl)propane, 1,4-di-(4-piperidyl)butane and tetramethylguanidine; tertiary amines such as trimethylamine, tri-ethylamine, tri-n-propylamine, tri-iso-propylamine, tri-1,2-dimethylpropylamine, tri-3-methoxypropylamine, tri-n-butylamine, tri-iso-butylamine, tri-sec-butylamine, tri-pentylamine, tri-3-pentylamine, tri-n-hexylamine, tri-n-octylamine, tri-2-ethylhexylamine, tri-dodecylamine, tri-laurylamine, dicyclohexylethylamine, cyclohexyldiethylamine, tricyclohexylamine, N,N-dimethylhexylamine, N-methyldihexylamine, N,N-dimethylcyclohexylamine, N-methyldicyclohexylamine, N,N-diethylethanolamine, N,N-dimethylethanolamine, N-ethyldiethanolamine, triethanolamine, tribenzylamine, N,N-dimethylbenzylamine, diethylbenzylamine, triphenylamine, N,N-dimethylamino-p-cresol, N,N-dimethylaminomethylphenol, 2-(N,N-dimethylaminomethyl)phenol, N,N-dimethylaniline, N,N-diethylaniline, pyridine, quinoline, N-methylmorpholine, N-methylpiperidine and 2-(2-dimethylaminoethoxy)-4-methyl-1,3,2-dioxabornane; tertiary poly-amines such as tetramethylethylenediamine, pyrazine, N,N'-dimethylpiperazine, N,N'-bis[(2-hydroxy)propyl]piperazine, hexamethylenetetramine, N,N,N',N'-tetramethyl-1,3-butane-amine, 2-dimethylamino-2-hydroxypropane, diethylaminoethanol, N,N,N-tris(3-dimethylaminopropyl)amine, 2,4,6-tris-(N,N-dimethylaminomethyl)phenol and pentamethylisobiguanide; imidazoles such as imidazole, N-methylimidazole, 2-methylimidazole, 4-methylimidazole, N-ethylimidazole, 2-ethylimidazole, 4-ethylimidazole, N-butylimidazole, 2-butylimidazole, N-undecylimidazole, 2-undecylimidazole, N-phenylimidazole, 2-phenylimidazole, N-benzylimidazole, 2-benzylimidazole, 1-benzyl-2-methylimidazole, N-(2'-cyanoethyl)-2-methylimidazole, N-(2'-cyanoethyl)-2-undecylimidazole, N-(2'-cyanoethyl)-2-phenylimidazole, 3,3-bis(2-ethyl-4-methylimidazolyl)methane, adducts of alkylimidazoles and isocyanuric acid and condensates of alkylimidazoles and formaldehyde, and amidines such as 1,8-diazabicyclo[5.4.0]undecene, 1,5-diazabicyclo[4.3.0]nonene-5, 6-dibutylamino-1,8-diazabicyclo[5.4.0]undecene-7, (2) quaternary ammonium salts of the amines of the above-mentioned (1) with halogens, mineral acids, Lewis acids, organic acids, silicic acids and fluoroboric acid, (3) complexes of the amines of the above-mentioned (1) with boranes and boron trifluoride, (4) phosphines such as trimethylphosphine, tri-ethylphosphine, tri-isopropylphosphine, tri-n-butylphosphine, tri-n-hexylphosphine, tri-n-octylphosphine, tri-cyclohexylphosphine, triphenylphosphine, tribenzylphosphine, tris(2-methylphenyl)phosphine, tris(3-methylphenyl)phosphine, tris(4-methylphenyl)phosphine, tris(diethylamino)phosphine, tris(4-methylphenyl)phosphine, dimethylphenylphosphine, diethylphenylphosphine, dicyclohexylphenylphosphine, ethyldiphenylphosphine, diphenylcyclohexylphosphine and chlorodiphenylphosphine, (5) mineral acids such as hydrochloric acid, sulfuric acid, nitric acid, phosphoric acid and carbonic acid, and half esters thereof, (6) Lewis acids typified by boron trifluoride and etherates of boron trifluoride, (7) organic acids typified by carboxylic acids and half esters thereof, and (8) silicic acids and fluoroboric acid.

Above all, the preferable compounds which scarcely discolor the polymerized products are the primary monoamines, the secondary monoamines, the tertiary monoamines, the tertiary polyamines, the imidazoles, the amidines, the quaternary ammonium salts and the phosphines. More preferable compounds are the secondary monoamines, the tertiary monoamines, the tertiary polyamines, the imidazoles, the amidines, the quaternary ammonium salts and the phosphines which have at most one group capable of reacting with an episulfide group. These compounds may be used singly or in the state of a mixture of two or more thereof. The above-mentioned polymerizing catalyst can usually be used in an amount of 0.0001 mol to 1.0 mol, preferably 0.0001 to 0.5 mol, more preferably 0.0001 to less than 0.1 mol, most preferably 0.0001 to 0.05, per mol of the compound having one or more of the structures represented by the formula (1) in one molecule. If the amount of the polymerizing catalyst is more than this range, the refractive index and the heat resistance of the polymerized product deteriorate, and discoloring occurs. On the other hand, if it is less than the above-mentioned range, the polymerization does not sufficiently proceed and the heat resistance is insufficient.

The composition of the present invention can be prepared by polymerizing a compound having two or more functional groups capable of reacting with an episulfide group and/or an epoxy group in the compound (a), or a compound having one or more groups of these functional groups and one or more other homopolymerizable functional groups, a compound having one or more of these homopolymerizable functional groups and a compound having one homopolymerizable functional group which can react with the episulfide group and/or the epoxy group. Examples of the compound having two or more functional groups capable of reacting with the episulfide group and/or the epoxy group in the compound (a) include epoxy compounds, known episulfide compounds and polyvalent carboxylic anhydrides.

On the other hand, examples of the compound having one or more functional groups capable of reacting with the episulfide group and/or the epoxy group and one or more of the other homopolymerizable functional groups include epoxy compounds, episulfide compounds and carboxylic anhydrides having unsaturated groups such as a methacrylic group, an acrylic group, a vinyl group and an aromatic vinyl group.

Examples of the compound having one or more homopolymerizable functional groups include compounds having unsaturated groups such as a methacrylic group, an acrylic group, an allyl group, a vinyl group and an aromatic vinyl group.

Examples of the compound having two or more functional groups capable of reacting with the episulfide group are as follows.

Typical examples of the epoxy compound include phenolic epoxy compounds prepared by the condensation of an epihalohydrin and polyvalent phenolic compounds such as hydroquinone, catechol, resorcin, bisphenol A, bisphenol F, bisphenol sulfone, bisphenol ether, bisphenol sulfide, bisphenol sulfide, halogenated bisphenol A and novolak resins; alcoholic epoxy compounds prepared by the condensation of an epihalohydrin and polyvalent alcoholic compounds such as ethylene glycol, diethylene glycol, triethylene glycol, polyethylene glycol, propylene glycol, dipropylene glycol, polypropylene glycol, 1,3-propanediol, 1,4-butane-diol, 1,6-hexanediol, neopentyl glycol, glycerin, trimethylolpropane trimethacrylate, pentaerythritol, 1,3- and 1,4-cyclohexanediol, 1,3- and 1,4-cyclohexanedimethanol, hydrogenated bisphenol A, bisphenol A.oethylene oxide adducts and bisphenol A.propylene oxide adducts; glycidyl ester epoxy compounds prepared by the condensation of an epihalohydrin and polyvalent carboxylic acid compounds such as adipic acid, sebacic acid, dodecandicarboxylic acid, dimer acid, phthalic acid, isophthalic acid, terephthalic acid, tetrahydrophthalic acid, methyltetrahydrophthalic acid, hexahydrophthalic acid, hexahydroisophthalic acid, hexahydroterephthalic acid, Het acid, Nadic acid, maleic acid, succinic acid, fumaric acid, trimellitic acid, benzenetetracarboxylic acid, benzophenonetetracarboxylic acid, naphthalinedicarboxylic acid and diphenyldicarboxylic acid; amine epoxy compounds prepared by the condensation of an epihalohydrin and primary diamines such as ethylenediamine, 1,2-diaminopropane, 1,3-diaminopropane, 1,2-diaminobutane, 1,3-diaminobutane, 1,4-diaminobutane, 1,5-diaminopentane, 1,6-diaminohexane, 1,7-diaminoheptane, 1,8-diaminooctane, bis(3-aminopropyl) ether, 1,2-bis(3-aminopropoxy)ethane, 1,3-bis(3-aminopropoxy)-2,2'-dimethylpropane, 1,2-, 1,3- and 1,4-bisaminocyclohexane, 1,3- and 1,4-bisaminomethylcyclohexane, 1,3- and 1,4-bisaminoethylcyclohexane, 1,3- and 1,4-bisaminopropycylhexane, hydrogenated 4,4'-diaminodiphenylmethane, isophoronediamine, 1,4-bisaminopropylpiperazine, m- and p-phenylenediamine, 2,4- and 2,6-tolylenediamine, m- and p-xylylenediamine, 1,5- and 2,6-naphthalenediamine, 4,4'-diaminodiphenylmethane, 4,4'-diaminodiphenyl ether and 2,2-(4,4'-diaminodiphenyl)propane, and secondary diamines such as N,N'-dimethylethylenediamine, N,N'-dimethyl-1,2-diaminopropane, N,N'-dimethyl-1,3-diaminopropane, N,N'-dimethyl-1,2-diaminobutane, N,N'-dimethyl-1,3-diaminobutane, N,N'-dimethyl-1,4-diaminobutane, N,N'-dimethyl-1,5-diaminopentane, N,N'-dimethyl-1,6-diaminohexane, N,N'-dimethyl-1,7-diaminoheptane, N,N'-diethylethylenediamine, N, N'-diethyl-1,2-diaminopropane, N,N'-diethyl-1,3-diaminopropane, N,N'-diethyl-1,2-diaminobutane, N,N'-diethyl-1,3-diaminobutane, N,N'-diethyl-1,4-diaminobutane, N,N'-diethyl-1,6-diaminohexane, piperazine, 2-methylpiperazine, 2,5- and 2,6-dimethylpiperazine, homopiperazine, 1,1-di-(4-piperidyl)methane, 1,2-di-(4-piperidyl)ethane, 1,3-di-(4-piperidyl)propane and 1,4-di-(4-piperidyl)butane; alicyclic epoxy compounds such as 3,4-epoxycyclohexyl-3,4-epoxycyclohexane carboxylate, vinylcyclohexane dioxide, 2-(3,4-epoxycyclohexyl)-5,5-spiro-3,4-epoxycyclohexane-metadioxane and bis(3,4-epoxycyclohexyl)adipate; epoxy compounds prepared by the epoxidation of unsaturated compounds such as cyclopentadiene epoxide, epoxidized soybean oil, epoxidized polybutadiene and vinylcyclohexene epoxide; and urethane epoxy compounds prepared by reactions of the above-mentioned polyvalent alcohols and phenolic compounds with di-isocyanates and glycidol.

Typical examples of the episulfide compound include episulfide compounds obtained by converting part or all of the epoxy groups of the above-mentioned epoxy compounds into episulfide groups.

Typical examples of the polyvalent carboxylic anhydride include compounds mentioned above as the materials which are partners of the reaction with the epihalohydrin described in the paragraph regarding the above-mentioned epoxy compounds.

Furthermore, the typical examples of the compound having one or more functional groups capable of reacting with the an episulfide group and/or an epoxy group and one or more other homopolymerizable functional groups are as follows.

Examples of the epoxy compound having an unsaturated group include vinyl phenylglycidyl ether, vinyl benzylglycidyl ether, glycidyl methacrylate, glycidyl acrylate and allyglycidyl ether. Examples of the episulfide compound having an unsaturated group include compounds in which the epoxy groups of the above-mentioned epoxy compounds having the unsaturated group are replaced with episulfide groups, for examples, vinyl phenylthioglycidyl ether, vinyl benzylthioglycidyl ether, thioglycidyl methacrylate, thioglycidyl acrylate and ally thioglycidyl ether.

Typical examples of the compound having one or more homopolymerizable functional groups include compounds having an ester structure of acrylic acid or methacrylic acid with an alcohol having one or more valences such as methyl acrylate, methyl methacrylate, ethyl acrylate, ethyl methacrylate, ethylene glycol diarylate, ethylene glycol dimethacrylate, diethylene glycol diacrylate, diethylene glycol dimethacrylate, triethylene glycol diacrylate, triethylene glycol dimethacrylate, polyethylene glycol diacrylate, polyethylene glycol dimethacrylate, 1,3-butylene glycol diacrylate, 1,3-butylene glycol dimethacrylate, 1,6-hexanediol diacrylate, 1,6-hexanediol dimethacrylate, neopentyl glycol diarylate, neopentyl glycol dimethacrylate, propylene glycol diacrylate, polypropylene glycol dimethacrylate, 2,2-bis[4-(acryloxyethoxy)phenyl]propane, 2,2-bis[4-(methacryloxyethoxy)phenyl]propane, 2,2-bis[4-(acryloxy.diethoxy)phenyl]propane, 2,2-bis[4-(methacryloxy.diethoxy)phenyl]propane, 2,2-bis[4-(acryloxy.polyethoxy)phenyl]propane, 2,2-bis[4-(methacryloxy.polyethoxy)phenyl]propane, trimethylolpropane triacrylate, trimethylolpropane trimethacrylate, pentaerythritol tetraacrylate, pentaerythritol tetramethacrylate, hexaacrylate of bis(2,2,2-trimethylolethyl)ether and hexamethacrylate of bis(2,2,2-trimethylolethyl)ether; allylcompounds such as allyl sulfide, dially phthalate and diethlene glycol bisacrylcarbonate; vinyl compounds such as acrolein, acrylonitrile and vinyl sulfide; and aromatic compounds such as styrene, α-methylstyrene, methylvinylbenzene, ethylvinylbenzene, α-chlorostyrene, chlorovinylbenzene, vinylbenzyl chloride, paradivinylbenzene and metadivinylbenzene.

In addition, typical preferable examples of the compound having one homopolymerizable functional group which is capable of reacting with the episulfide group and/or the epoxy group include compounds having one epoxy group or one episulfide group. Typical examples thereof include monoepoxy compounds such as ethylene oxide, propylene oxide and glycidol, glycidyl esters of monocarboxylic acids such as acetic acid, propionic acid and benzoic acid, glycidyl ethers such as methyl glycidyl ether, ethyl glycidyl ether, propyl glycidyl ether and butyl glycidyl ether, monoepisulfide compounds such as ethylene sulfide and propylene sulfide, thioglycidyl esters having a structure derived from the above-mentioned monocarboxylic acids and thioglycidol (1,2-epithio-3-hydroxypropane), thioglycidyl ethers such as methylthioglycidyl ether (1,2-epithiopropyloxymethane), ethylthio glycidyl ether, propyl thioglycidyl ether and butyl thioglycidyl ether. Above all, the compounds having one episulfide group are more preferable.

Among the compounds (a) of the present invention, the compound having two or more functional groups capable of reacting with the episulfide group and/or the epoxy group, or the compound having one or more of these functional groups and one or more other homopolymerizable functional groups can be prepared by polymerizing in the presence of a polymerizing catalyst. As the polymerizing catalyst, the above-mentioned amines, phosphines and acids can be used. Typical usable examples thereof include the above-mentioned compounds.

Furthermore, when the compound having the unsaturated group is used, it is preferable to use a radical polymerization initiator as a polymerization promotor. As the radical polymerization initiator, any compound can be used, so long as it can produce radicals by heating, ultraviolet radiation or electron radiation. Examples of the radical polymerization initiator include known heat polymerization catalysts, for example, peroxides such as cumyl peroxyneodecanoate, diisopropyl peroxydicarbonate, diallyl peroxydicarbonate, di-n-propylperoxydicarbonate, dimyristyl peroxydicarbonate, cumyl peroxyneohexanoate, tert-hexyl peroxyneodecanoate, tert-butyl peroxydeodecanoate, tert-hexyl peroxyneohexanoate, tert-butyl peroxyneohexanoate, 2,4-dichlorobenzoyl peroxide, benzoyl peroxide, dicumyl peroxide and di-tert-butyl peroxide; hydroperoxides such as cumene hydroperoxide and tertbutylhydroperoxide; azo compounds such as 2,2'-azobis(4-methoxy-2,4-dimethylvaleronitrile), 2,2'-azobis(2-cyclopropylpropionitrile), 2,2'-azobis(2,4-dimethylvaleronitrile), 2,2'-azobisisobutylonitrile, 2,2'-azobis(2-methylbutylonitrile), 1,1'-azobis(cyclohexane-1-carbonitrile), 1-[(1-cyano-1-methylethyl)azo]formamide, 2-phenylazo-4-methoxy-2,4-dimethyl-valeronitrile, 2,2'-azobis(2-methylpropane) and 2,2'-azobis(2,4,4-trimethylpentane), and known photopolymerization catalysts such as benzophenone and benzoinbenzoin methyl ether. Above all, the peroxides, the hydroperoxides and the azo compounds are preferable, and the peroxides and the azo compounds are more preferable. The compounds which are most preferable are azo compounds such as 2,2'-azobis(4-methoxy-2,4-dimethylvaleronitrile), 2,2'-azobis(2-cyclopropylpropionitrile), 2,2'-azobis(2,4-dimethylvaleronitrile), 2,2'-azobisisobutylonitrile, 2,2'-azobis(2-methylbutylonitrile), 1,1'-azobis(cyclohexane-1-carbonitrile), 1-[(1-cyano-1-methylethyl)azo]formamide, 2-phenylazo-4-methoxy-2,4-dimethyl-valeronitrile, 2,2'-azobis(2-methylpropane) and 2,2'-azobis(2,4,4-trimethylpentane). They can be used in the state of a mixture thereof.

The amount of the radical polymerization initiator to be blended depends on the components of the composition and a polymerizing process, and it cannot sweepingly be decided. Nevertheless, the amount of the radical polymerization initiator is usually in the range of 0.01 to 5.0% by weight, preferably 0.1 to 2.0% by weight based on the total weight of the composition.

Needless to say, it is possible that when the composition of the present invention is polymerized to obtain the optical material, known additives such as an antioxidant and an ultraviolet absorber can be added to the composition so as to improve the practicality of the obtained material. Moreover, the composition of the present invention tends to peel from a mold during the polymerization, and as the case may be, it is necessary that a known external and/or an internal adhesive properties improver should be used or added so as to control and improve the adhesive properties between the polymerized material and the mold. The internal adhesive properties improver referred to herein is a silane compound such as 3-methacryloxypropyl trimethoxy silane, 3-glycidoxypropyl trimethoxy silane or 3-mercaptopropyl trimethoxy silane, and the internal adhesive properties improver can be used in an amount of 0.0001 to 5 parts by weight with respect to 100 parts by weight of the composition of the present invention. In order to further impart dyeing properties to the material obtained by polymerizing the composition according to the present invention, it is possible to use a compound having a hydroxyl group as a dyeing properties improving component. Examples of this compound having the hydroxyl group include 3-phenoxy-2-hydroxypropyl acrylate, 2-hydroxyethyl isocyanurate bisacrylate, 2-hydroxyethyl acrylate and glycidol. This kind of compound can be used in an amount of 0.001 to 40 parts by weight with respect to 100 parts by weight of the composition of the present invention.

An optical material for lenses and the like can be obtained by polymerizing the composition of the present invention as follows. In the first place, the starting compound (a) and the other starting compound (b) are mixed with each other, if necessary, together with additives such as the above-mentioned polymerizing catalyst, the compound having the unsaturated group and capable of reacting with the episulfide group and/or the epoxy group, for example, glycidyl methacrylate or thioglycidyl methacrylate (in which the epoxy group of the glycidyl methacrylate is replaced with the episulfide group), the radical polymerization initiator, a radically polymerizable monomer, the adhesive properties improver, the antioxidant other than the above-mentioned compound (b) and the ultraviolet absorber. Next, the resultant mixture is poured into a glass mold or a metallic mold, and then heated to advance a polymerization reaction. Afterward, the desired optical material is released from the mold.

There can suitably be combined the starting compound (a) and the other starting compound (b) as well as the secondary material, i.e., the compound having two or more functional groups capable of reacting with the episulfide group and/or the epoxy group of the compound (a), the compound having one or more of these functional groups and one or more other homopolymerizable functional groups, the compound having one or more of these homopolymerizable functional groups, or the compound having one homopolymerizable functional group capable of reacting with the episulfide group and/or the epoxy group, and a reaction can then suitably preliminarily be carried out.

For example, in a singly reactable case, a combination of the singly reactable material and/or the singly reactable other material and/or the secondary material is possible. Alternatively, in a singly unreactable case, a combination of the other reactable material and/or the secondary material is possible.

Prior to casting, a part or all of these materials can preliminarily be reacted at a temperature of −100 to 160° C. for a period of 0.1 to 48 hours in the presence or the absence of a catalyst with stirring or without stirring, and the remaining materials can then be added to the reaction system to regulate the composition, followed by the casting.

The singly reactable case referred to herein means a case where the starting material or the secondary material comprises a singly unreactable compound alone, or a case where the starting material or the secondary material comprises a plurality of the singly unreactable and mutually unreactable compounds.

The polymerizing time is usually in the range of 0.1 to 100 hours, preferably 1 to 48 hours, and the polymerizing temperature is usually in the range of −10 to 160° C., preferably −10 to 140° C. The polymerization can be carried out at a predetermined temperature within the above-mentioned polymerization temperature range for a predetermined temperature within the above-mentioned polymerization time range at a temperature rise rate of 0.1 to 100° C./hr and at a temperature drop rate of 1 to 100° C./hr. After the completion of the polymerizing step, the obtained optical material of the present invention is preferably subjected to an annealing treatment at a temperature of 50 to 150° C. for a period of 10 minutes to about 5 hours to remove the strain of the optical material. As needed, surface treatments such as dyeing, hard coating, the prevention of reflection and the impartment of fog resistance can be performed.

Next, a preparation method of the polymerized resin optical material of the present invention will be described in more detail. As described above, the polymerized resin optical material can be prepared by mixing the main starting materials and the secondary materials, pouring the mixture into the mold, and then polymerizing the same therein. The compound (a) and the compound (b) which are the main starting materials, the compound having two or more functional groups capable of reacting with the episulfide group and/or the epoxy group, the compound having one or more of these functional groups and one or more other homopolymerizable functional groups, the compound having one or more homopolymerizable functional groups, or the compound having one homopolymerizable functional group capable of reacting with the episulfide group and/or the epoxy group which can be used as needed, and the polymerizing catalyst, the radical polymerization initiator, the adhesive properties improver, the stabilizer and the like which can be used as needed may all simultaneously be mixed in one container, or the respective materials may stepwise be added and mixed, or some materials may separately be mixed and the resulting mixtures may then be mixed again in one container. A temperature and a time required in the mixing step are fundamentally such that the respective components are sufficiently mixed. If the temperature and the time of the mixing are excessive, some unpreferable reactions take place among the starting materials and the additives, and the viscosity of the mixture tends to increase, so that the pouring operation of the mixture is difficult. The starting materials and the secondary materials may be mixed in any order. The mixing temperature is usually in the range of −20 to about 100° C., preferably −10 to 50° C., more preferably −5 to 30° C. The mixing time is usually in the range of 1 minute to 5 hours, preferably 5 minutes to 2 hours, more preferably 5 minutes to 30 minutes, most preferably 5 minutes to 15 minutes. Before, during or after the mixing of the respective starting materials and additives, a degassing operation may preferably be carried out under reduced pressure in order to prevent the generation of bubbles during the subsequent polymerization in the mold. At this time, a vacuum degree is usually within the range of about 0.1 to 700 mmHg, preferably 10 to 300 mmHg. In addition, impurities can preferably be removed from the mixture through a microfilter or the like prior to pouring the mixture into the mold in order to enhance the quality of the optical material of the present invention.

By polymerizing a composition of the present invention, a polymerized resin optical material can be obtained, and the thus obtained optical material can possess a good balance between a refractive index and an Abbe's number which can scarcely be acquired by the use of a conventional material. Moreover, a high oxidation resistance can be imparted to the optical material of the present invention without impairing heat resistance.

Next, the present invention will be described in more detail in accordance with examples, but the scope of the present invention should not be limited to these examples at all. Incidentally, the evaluation of obtained polymers was made by the following procedures.

Oxidation resistance: It was evaluated on the basis of a change quantity of b values before and after a heat treatment at 120° C. for 3 hours in air.

Change quantity=$A-B$ wherein A is the b value after the heat treatment, and B is the b value before the heat treatment.

Heat resistance: It was evaluated on the basis of a temperature at which modulus of elasticity was 0.5 GPa by a flexural dynamic viscoelasticity measurement. With regard to measurement conditions, a frequency was 10 Hz, a temperature was in the range of 30 to 130°, and a temperature rise is 2° C./min.

Refractive index (nD) and Abbe's number (νD): They were measured at 25° C. by the use of an Abbe refractometer.

EXAMPLE 1

0.5 part by weight of 2-diethylaminoethanol as a catalyst was mixed with 67 parts by weight of bis(β-epithiopropyl)sulfide as a compound (a) and 33 parts by weight of thiophenol as a compound (b), followed by stirring at room temperature to obtain a uniform solution. At this time, a molar ratio of an SH group in the compound (b) to the total of an episulfide group in the compound (a) was 0.399. Next, the resultant composition was poured into a mold for a lens, and then heated from 10° C. to 120° C. over 22 hours in an oven to polymerize the same, thereby preparing a lens. The thus obtained lens had a good oxidation resistance and heat resistance as well as excellent optical properties and physical properties. In addition, the surface state of the lens was good, and striae and surface deformation were scarcely observed. The various characteristics of the obtained lens are shown in Table 1.

EXAMPLES 2 to 16

The same procedure as in Example 1 was repeated except that each composition shown in Tables 1 and 2 was employed and 0.5 part by weight of 2-diethylaminoethanol with respect to 100 parts by weight of the composition was used as a catalyst.

In any case, the obtained lens had a good oxidation resistance and heat resistance as well as excellent optical properties and physical properties. In addition, the surface state of the lens was good, and striae and surface deformation were scarcely observed. The various characteristics of the lenses obtained in Examples 2 to 13 are shown in Table 1, and those of the lenses obtained in Examples 14 to 16 are shown in Table 2.

EXAMPLE 17

0.5 part by weight of 2-diethylaminoethanol as a catalyst, 0.2 part by weight of 2,6-di-tert-butyl-4-methylphenol as an antioxidant and 0.1 part by weight of 2-(2-hydroxy-5-tert-octylphenyl)benzotriazole as an ultraviolet light absorber were mixed with 100 parts by weight of the total of 93 parts by weight of bis(β-epithiopropyl)sulfide as a compound (a)

and 7 parts by weight of thiophenol as a compound (b), followed by stirring at room temperature to obtain a uniform solution. Furthermore, degassing was sufficiently carried out under a reduced pressure of 10 mmHg. At this time, a molar ratio of an SH group in the compound (b) to the total of an episulfide group in the compound (a) was 0.061. Next, the resultant composition was poured into a mold for a lens, and then heated from 10° C. to 120° C. over 22 hours in an oven to polymerize the same, thereby preparing a lens. The thus obtained lens had a good oxidation resistance and heat resistance as well as excellent optical properties and physical properties. In addition, the surface state of the lens was good, and striae and surface deformation were scarcely observed. The various characteristics of the obtained lens are shown in Table 2.

EXAMPLE 18

The same procedure as in Example 17 was repeated except that 0.5 part by weight of 2-diethylaminoethanol as a catalyst, 0.2 part by weight of 2,6-di-tert-butyl-4-methylphenol as an antioxidant and 0.1 part by weight of 2-(2-hydroxy-5-tert-octylphenyl)benzotriazole as an ultraviolet light absorber were mixed with 100 parts by weight of the total of 93 parts by weight of bis($\beta$-epithiopropyl) sulfide as a compound (a) and 7 parts by weight of n-butyl thioglycolate as a compound (b). At this time, a molar ratio of an SH group in the compound (b) to the total of an episulfide group in the compound (a) was 0.045. An obtained lens had a good oxidation resistance and heat resistance as well as excellent optical properties and physical properties. In addition, the surface state of the lens was good, and striae and surface deformation were scarcely observed. The various characteristics of the obtained lens are shown in Table 2.

Example 19

The same procedure as in Example 17 was repeated except that 0.5 part by weight of 2-diethylaminoethanol as a catalyst, 0.2 part by weight of 2,6-di-tert-butyl-4-methylphenol as an antioxidant and 0.1 part by weight of 2-(2-hydroxy-5-tert-octylphenyl)benzotriazole as an ultraviolet light absorber were mixed with 100 parts by weight of the total of 95 parts by weight of bis($\beta$-epithiopropyl) sulfide as a compound (a) and 5 parts by weight of bis(2-mercaptoethyl)sulfide as a compound (b). At this time, a molar ratio of an SH group in the compound (b) to the total of an episulfide group in the compound (a) was 0.061. An obtained lens had a good oxidation resistance and heat resistance as well as excellent optical properties and physical properties. In addition, the surface state of the lens was good, and striae and surface deformation were scarcely observed. The various characteristics of the obtained lens are shown in Table 2.

EXAMPLE 20

0.05 part by weight of 3-glycidoxypropyl trimethoxy silane as an adhesive properties improver and 0.5 part by weight of 2-diethylaminoethanol as a catalyst were mixed with 100 parts by weight of the total of 93 parts by weight of bis($\beta$-epithiopropyl)sulfide as a compound (a) and 7 parts by weight of thiophenol as a compound (b), followed by stirring at room temperature to obtain a uniform solution. At this time, a molar ratio of an SH group in the compound (b) to the total of an episulfide group in the compound (a) was 0.061. Next, the resultant composition was poured into a mold for a lens, and then heated from 10° C. to 120° C. over 22 hours in an oven to polymerize the same, thereby preparing a lens. During the polymerization, the resultant polymer was not peeled from the mold. The thus obtained lens had a good oxidation resistance and heat resistance as well as excellent optical properties and physical properties. In addition, owing to the addition of the adhesive properties improver, the surface state of the lens was better than in the case that any adhesive properties improver was not used, and striae and surface deformation were scarcely observed. The various characteristics of the obtained lens are shown in Table 2.

EXAMPLE 21

The same procedure as in Example 20 was repeated except that 0.05 part by weight of 3-glycidoxypropyl trimethoxy silane as an adhesive properties improver and 0.5 part by weight of 2-diethylaminoethanol as a catalyst were mixed with 100 parts by weight of the total of 93 parts by weight of bis($\beta$-epithiopropyl)sulfide as a compound (a) and 7 parts by weight of n-butyl thioglycolate as a compound (b). At this time, a molar ratio of an SH group in the compound (b) to the total of an episulfide group in the compound (a) was 0.045. During the polymerization, the resultant polymer was not peeled from the mold. The thus obtained lens had a good oxidation resistance and heat resistance as well as excellent optical properties and physical properties. In addition, owing to the addition of the adhesive properties improver, the surface state of the lens was better than in the case that any adhesive properties improver was not used, and striae and surface deformation were scarcely observed. The various characteristics of the obtained lens are shown in Table 2.

EXAMPLE 22

The same procedure as in Example 20 was repeated except that 0.05 part by weight of 3-glycidoxypropyl trimethoxy silane as an adhesive properties improver and 0.5 part by weight of 2-diethylaminoethanol as a catalyst were mixed with 100 parts by weight of the total of 95 parts by weight of bis($\beta$-epithiopropyl)sulfide as a compound (a) and 5 parts by weight of bis(2-mercaptoethyl)sulfide as a compound (b). At this time, a molar ratio of an SH group in the compound (b) to the total of an episulfide group in the compound (a) was 0.061. During the polymerization, the resultant polymer was not peeled from the mold. The thus obtained lens had a good oxidation resistance and heat resistance as well as excellent optical properties and physical properties. In addition, owing to the addition of the adhesive properties improver, the surface state of the lens was better than in the case that any adhesive properties improver was not used, and striae and surface deformation were scarcely observed. The various characteristics of the obtained lens are shown in Table 2.

EXAMPLE 23

5 parts by weight of glycidyl as a dyeing properties improver and 0.5 part by weight of 2-diethylaminoethanol as a catalyst were mixed with 100 parts by weight of the total of 93 parts by weight of bis($\beta$-epithiopropyl)sulfide as a compound (a) and 7 parts by weight of thiophenol as a compound (b), followed by stirring at room temperature to obtain a uniform solution. At this time, a molar ratio of an SH group in the compound (b) to the total of an episulfide group in the compound (a) was 0.061. Next, the resultant composition was poured into a mold for a lens, and then heated from 10° C. to 120° C. over 22 hours in an oven to polymerize the same, thereby preparing a lens. The thus obtained lens had a good oxidation resistance and heat resistance as well as excellent optical properties and physical properties, and owing to the addition of the dyeing properties improver, the dyeing properties of the lens were improved. In addition, the surface state of the lens was good, and striae and surface deformation were scarcely observed. The various characteristics of the obtained lens are shown in Table 2.

EXAMPLE 24

The same procedure as in Example 23 was repeated except that 5 parts by weight of glycidol as a dyeing properties improver and 0.5 part by weight of 2-diethylaminoethanol as a catalyst were mixed with 100 parts by weight of the total of 93 parts by weight of bis(β-epithiopropyl)sulfide as a compound (a) and 7 parts by weight of n-butyl thioglycolate as a compound (b). At this time, a molar ratio of an SH group in the compound (b) to the total of an episulfide group in the compound (a) was 0.045. The resultant lens had a good oxidation resistance and heat resistance as well as excellent optical properties and physical properties, and owing to the addition of the dyeing properties improver, the dyeing properties of the lens were improved. In addition, the surface state of the lens was good, and striae and surface deformation were scarcely observed. The various characteristics of the obtained lens are shown in Table 2.

EXAMPLE 25

The same procedure as in Example 23 was repeated except that 5 parts by weight of 3-phenoxy-2-hydroxypropyl acrylate as a dyeing properties improver and 0.5 part by weight of 2-diethylaminoethanol as a catalyst were mixed with 100 parts by weight of the total of 95 parts by weight of bis(β-epithiopropyl)sulfide as a compound (a) and 5 parts by weight of bis(2-mercaptoethyl)sulfide as a compound (b). At this time, a molar ratio of an SH group in the compound (b) to the total of an episulfide group in the compound (a) was 0.061. The resultant lens had a good oxidation resistance and heat resistance as well as excellent optical properties and physical properties, and owing to the addition of the dyeing properties improver, the dyeing properties of the lens were improved. In addition, the surface state of the lens was good, and striae and surface deformation were scarcely observed. The various characteristics of the obtained lens are shown in Table 2.

COMPARATIVE EXAMPLE 1

The same procedure as in Example 1 was conducted except that 100 parts by weight of bis(β-epithiopropyl) sulfide as a compound (a) and 0.5 part by weight of 2-diethylaminoethanol as a catalyst were used and a compound (b) was not used. The results are shown in Table 3. Since the compound (b) was not used, heat resistance was not satisfactory.

COMPARATIVE EXAMPLES 2 to 10

The same procedure as in Example 1 was conducted except that each composition shown in Table 3 was used and 2-diethylaminoethanol was used as a catalyst in an amount of 0.5 part by weight with respect to 100 parts by weight of the composition. The results are shown in Table 3. In any case, since the total molar ratio of active hydrogen in a compound (b) to the total of an episulfide group in the compound (a) was in excess of the range of the present invention, the heat resistance of an obtained lens was poor.

COMPARATIVE EXAMPLE 11

The same procedure as in Example 1 was conducted except that a composition shown in Table 3 was used and 2-diethylaminoethanol was used as a catalyst in an amount of 0.5 part by weight with respect to 100 parts by weight of the composition. The results are shown in Table 3. Since an episulfide compound which was outside the scope of the present invention was used, the oxidation resistance of an obtained lens was not satisfactory.

TABLE 1

| | Composition (parts by weight) | | | | SH Group/ Episulfide Group[1] | Oxidation Resistance | Heat Resistance (° C.) | nD | νD |
|---|---|---|---|---|---|---|---|---|---|
| | Compound (a) | | Compound (b) | | | | | | |
| Example 1 | Bis(β-epithio-propyl) sulfide | (67) | Thiophenol | (33) | 0.399 | 0.01 | 69 | 1.686 | 35 |
| Example 2 | Bis(β-epithio-propyl) sulfide | (65) | Ethyl thioglycolate | (35) | 0.399 | 0.00 | 68 | 1.670 | 38 |
| Example 3 | Bis(β-epithio-propyl) sulfide | (77) | Thiophenol | (25) | 0.242 | 0.01 | 76 | 1.692 | 35 |
| Example 4 | Bis(β-epithio-propyl) sulfide | (75) | Ethyl thioglycolate | (11) | 0.247 | 0.01 | 73 | 1.681 | 37 |
| Example 5 | Bis(β-epithio-propyl) sulfide | (85) | Thiophenol | (15) | 0.143 | 0.02 | 88 | 1.698 | 36 |
| Example 6 | Bis(β-epithio-propyl) sulfide | (83) | Ethyl thioglycolate | (17) | 0.152 | 0.01 | 86 | 1.690 | 37 |
| Example 7 | Bis(β-epithio-propyl) sulfide | (93) | Thiophenol | (7) | 0.061 | 0.02 | 94 | 1.703 | 36 |
| Example 8 | Bis(β-epithio-propyl) sulfide | (92) | Ethyl thioglycolate | (8) | 0.064 | 0.02 | 92 | 1.700 | 37 |
| Example 9 | Bis(β-epithio-propyl) sulfide | (92) | Ethyl (3-mercaptopropionate) | (8) | 0.058 | 0.03 | 92 | 1.700 | 37 |
| Example 10 | Bis(β-epithio-propyl) sulfide | (90) | 3-methoxybutyl (3-mercaptopropionate) | (10) | 0.048 | 0.03 | 91 | 1.689 | 37 |
| Example 11 | Bis(β-epithio-propyl) sulfide | (95) | bis(2-mercaptoethyl) sulfide | (5) | 0.061 | 0.02 | 94 | 1.708 | 36 |

TABLE 1-continued

| | Composition (parts by weight) | | | | SH Group/ Episulfide Group[1] | Oxidation Resistance | Heat Resistance (° C.) | nD | νD |
|---|---|---|---|---|---|---|---|---|---|
| | Compound (a) | | Compound (b) | | | | | | |
| Example 12 | Bis(β-epithio-propyl) sulfide | (95) | 2,5-dimercapto-methyl-1,4-dithian | (5) | 0.044 | 0.03 | 95 | 1.708 | 36 |
| Example 13 | Bis(β-epithio-propyl) sulfide | (95) | 2-(2-mercapto-ethylthio)-1,3-dimercapto-propane | (5) | 0.070 | 0.01 | 97 | 1.708 | 36 |

[1]: SH group/episulfide group [a molar ratio of the SH group in the compound (b) to the episulfide group in the compound (a)].

TABLE 2

| | Composition (parts by weight) | | | | SH Group/ Episulfide Group[1] | Oxidation Resistance | Heat Resistance (° C.) | nD | νD |
|---|---|---|---|---|---|---|---|---|---|
| | Compound (a) | | Compound (b) | | | | | | |
| Example 14 | Bis(β-epithio-propyl) sulfide | (95) | 1,2-bis(2-mercap-toethylthio)-3-mer-capto propane | (5) | 0.054 | 0.02 | 92 | 1.708 | 36 |
| Example 15 | 1,2-bis(β-epithio-propylthio)ethane | (95) | Thiophenol | (5) | 0.057 | 0.02 | 91 | 1.699 | 36 |
| Example 16 | Bis[2-(β-epithiopropyl-thio)ethyl] sulfide | (96) | Thiophenol | (4) | 0.071 | 0.01 | 89 | 1.688 | 36 |
| Example 17[1] | Bis(β-epithio-propyl) sulfide | (93) | Thiophenol | (7) | 0.061 | 0.00 | 93 | 1.703 | 36 |
| Example 18[2] | Bis(β-epithio-propyl) sulfide | (93) | n-butyl thio-glycolate | (7) | 0.045 | 0.00 | 91 | 1.697 | 37 |
| Example 19[2] | Bis(β-epithio-propyl) sulfide | (95) | Bis(2-mercapto-ethyl) sulfide | (5) | 0.061 | 0.00 | 93 | 1.708 | 36 |
| Example 20[3] | Bis(β-epithio-propyl) sulfide | (93) | Thiophenol | (7) | 0.061 | 0.01 | 93 | 1.703 | 36 |
| Example 21[3] | Bis(β-epithio-propyl) sulfide | (93) | n-butyl thio-glycolate | (7) | 0.045 | 0.02 | 90 | 1.697 | 37 |
| Example 22[3] | Bis(β-epithio-propyl) sulfide | (95) | Bis(2-mercapto-ethyl) sulfide | (5) | 0.061 | 0.01 | 92 | 1.707 | 36 |
| Example 23[4] | Bis(β-epithio-propyl) sulfide | (93) | Thiophenol | (7) | 0.061 | 0.01 | 91 | 1.695 | 37 |
| Example 24[4] | Bis(β-epithio-propyl) sulfide | (93) | n-butyl thio-glycolate | (7) | 0.045 | 0.02 | 90 | 1.687 | 38 |
| Example 25[4] | Bis(β-epithio-propyl) sulfide | (95) | Bis(2-mercapto-ethyl) sulfide | (5) | 0.061 | 0.01 | 92 | 1.701 | 37 |

[1]: SH group/episulfide group [a molar ratio of the SH group in the compound (b) to the episulfide group in the compound (a)].
[2]: 0.5 part by weight of 2,6-di-tert-butyl-4-methylphenol as an antioxidant and 0.5 part by weight of 2-(2-hydroxy-5-tert-octylphenyl)benzotriazole as an ultraviolet light absorber were added to 100 parts by weight of the composition.
[3]: 0.5 part by weight of 3-glycidoxypropyl trimethoxy silane as an adhesive properties improver was added to 100 parts by weight of the composition.
[4]: 5 parts by weight of glycidol as a dyeing properties improver was added to 100 parts by weight of the composition.
[5]: 5 parts by weight of 3-phenoxy-2-hydroxypropyl acrylate as a dyeing properties improver was added to 100 parts by weight of the composition.

TABLE 3

| | Composition (parts by weight) | | | | SH Group/ Episulfide Group[1] | Oxidation Resistance | Heat Resistance (° C.) | nD | νD |
|---|---|---|---|---|---|---|---|---|---|
| | Compound (a) | | Compound (b) | | | | | | |
| Comparative Example 1 | Bis(β-epithio-propyl) sulfide | (100) | | | 0.000 | 0.56 | >13 | 1.708 | 36 |
| Comparative Example 2 | Bis(β-epithio-propyl) sulfide | (55) | Thiophenol | (45) | 0.662 | 0.01 | 41 | 1.677 | 33 |
| Comparative Example 3 | Bis(β-epithio-propyl) sulfide | (55) | Ethyl thio-glycolate | (45) | 0.607 | 0.01 | 42 | 1.629 | 38 |
| Comparative Example 4 | Bis(β-epithio-propyl) sulfide | (52) | Ethyl (3-mercap-topropionate | (48) | 0.613 | 0.00 | 38 | 1.632 | 40 |
| Comparative Example 5 | Bis(β-epithio-propyl) sulfide | (65) | Bis(2-mercapto-ethyl) sulfide | (35) | 0.622 | 0.00 | 47 | 1.705 | 36 |

TABLE 3-continued

| | Composition (parts by weight) | | | | SH Group/ Episulfide Group[1] | Oxidation Resistance | Heat Resistance (° C.) | nD | vD |
|---|---|---|---|---|---|---|---|---|---|
| | Compound (a) | | Compound (b) | | | | | | |
| Comparative Example 6 | Bis(β-epithio-propyl) sulfide | (60) | 2,5-dimercapto-methyl-1,4-dithian | (40) | 0.560 | 0.00 | 48 | 1.705 | 36 |
| Comparative Example 7 | Bis(β-epithio-propyl) sulfide | (70) | 2-(2-mercapto-ethylthio)-1,3-dimercaptopropane | (30) | 0.572 | 0.01 | 49 | 1.706 | 36 |
| Comparative Example 8 | Bis(β-epithio-propyl) sulfide | (65) | 1,2-bis(2-mer-captoethylthio)-3-mercaptopropane | (35) | 0.553 | 0.00 | 48 | 1.705 | 36 |
| Comparative Example 9 | 1,2-bis(β-epithio-propylthio)ethane | (65) | Thiophenol | (35) | 0.582 | 0.01 | 44 | 1.680 | 34 |
| Comparative Example 10 | Bis[2-(β-epithio-propylthio)ethyl]-sulfide | (70) | Thiophenol | (30) | 0.580 | 0.01 | 43 | 1.675 | 34 |
| Comparative Example 11 | 2,2-bis[4-(β-epithio-propoxy)phenyl]-propane | (93) | Bis(2-mercapto-ethyl) sulfide | (7) | 0.128 | 1.51 | 91 | 1.624 | 30 |

[1]: SH group/episulfide group [a molar ratio of the SH group in the compound (b) to the episulfide group in the compound (a)].

What is claimed is:

1. A resinous composition which comprises
   (a) a compound having, in one molecule, one or more structures each having a three-membered rind represented by the formula (1)

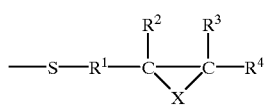

wherein $R^1$ is a hydrocarbon having 1 to 10 carbon atoms; $R^2$, $R^3$ and $R^4$ are each hydrogen or a hydrocarbon group having 1 to 10 carbon atoms; and X is S or O and a ratio of S is 50% or more on the average with respect to the total of S and O constituting the three-membered ring,
   and (b) a compound having one or more SH groups in one molecule,
   a ratio of the total mol number of the SH group in the compound (b) to the total mol number of an episulfide group or an epoxy group in the compound (a) being 0.001 to 0.5.

2. A resinous composition which comprises
   (a) a compound having, in one molecule, one or more structures each having a three-membered ring represented by the formula (1)

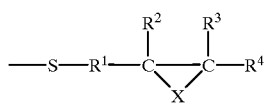

wherein $R^1$ is a hydrocarbon having 1 to 10 carbon atoms; $R^2$, $R^3$ and $R^4$ are each hydrogen or a hydrocarbon group having 1 to 10 carbon atoms; and X is S or O, and a ratio of S is 50% or more on the average with respect to the total of S and O constituting the three-membered ring,
   and (b) a compound having one or more SH groups in one molecule,
   a ratio of the total mol number of the SH group in the compound (b) to the total mol number of an episulfide group and an epoxy group in the compound (a) being 0.001 to 0.5.

3. The resinous composition according to claim 1 or 2 wherein the compound (a) is a compound represented by the following formula (2) having three-membered rings

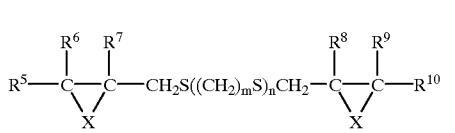

wherein $R^5$ to $R^{10}$ are each hydrogen or a hydrocarbon group having 1 to 10 carbon atoms; and X is S or O, and a ratio of S is 50% or more on the average with respect to the total of S and O constituting the three-membered rings; m is 1 to 6; and n is 0 to 4.

4. A resin which is obtained by polymerizing a composition described in claim 1.

5. An optical material which is obtained by polymerizing a composition described in claim 1.

6. The resinous composition according to claim 2 wherein the compound (a) is a compound represented by the following formula (2) having three-membered rings

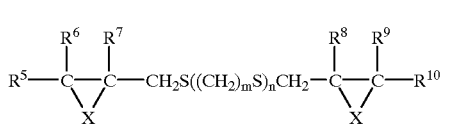

wherein $R^5$ to $R^{10}$ are each hydrogen or a hydrocarbon group having 1 to 10 carbon atoms; and X is S or O, and a ratio of S is 50% or more on the average with respect to the total of S and O consisting the three-numbered rings; m is 1 to 6; and n is 0 to 4.

7. A resin which is obtained by polymerizing a composition described in claim 2.

8. An optical material which is obtained by polymerizing a composition described in claim 2.

9. The resinous composition according to claim 1, wherein the ratio of the total mol number of the SH group in the compound (b) to the total mol number of an episulfide group or an epoxy group in the compound (a) is 0.001 to 0.3; and said ratio is 90% or more.

10. The resinous composition according to claim 1, wherein the ratio of the total mol number of the SH group in the compound (b) to the total mol number of an episulfide group or an epoxy group in the compound (a) is 0.001 to 0.2; and said ratio is 95% or more.

11. The resinous composition according to claim 1, wherein the ratio of the total mol number of the SH group in the compound (b) to the total mol number of an episulfide group or an epoxy group in compound (a) is 0.01 to 0.1; and said ratio is 100%.

12. The resinous composition according to claim 11, wherein $R^1$ is methylene or ethylene and $R^2$, $R^3$ and $R^4$ are each hydrogen or methyl.

13. The resinous composition according to claim 11, wherein $R^1$ is methylene and each of $R^2$, $R^3$ and $R^4$ is hydrogen.

14. The resinous composition according to claim 1, wherein the compound (a) is selected from the group consisting of bis(β-epithiopropylthio)methane, 1,2-bis(β-epithiopropylthio)ethane, 1,3-bis(β-epithiopropylthio)propane, 1,2-bis(β-epithiopropylthio)propane, 1-(β-epithiopropylthio)-2-(β-epithiopropylthiomethyl)propane, 1,4-bis(β-epithiopropylthio)butane, 1,3-bis(β-epithiopropylthio)butane, 1-(β-epithiopropylthio)-3-(β-epithiopropylthiomethyl)butane, 1,5-bis(β-epithiopropylthio)pentane, 1-(β-epithiopropylthio)-4-(β-epithiopropylthiomethyl)pentane, 1,6-bis(β-epithiopropylthio)hexane, 1-(β-epithiopropylthio)-5-(β-epithiopropylthiomethyl)hexane, 1-(β-epithiopropylthio)-2-[(2-β-epithiopropylthioethyl)thio]ethane, 1-(β-epithiopropylthio)-2-[{2-(2-β-epithiopropylthioethyl)thioethyl}thio]ethane, branched organic compounds such as tetrakis(β-epithiopropylthiomethyl)methane, 1,1,1-tris(β-epithiopropylthiomethyl)propane, 1,5-bis(β-epithiopropylthio)-2-(β-epithiopropylthiomethyl)-3-thiapentane, 1,5-bis(β-epithiopropylthio)- 2,4-bis(β-epithiopropylthiomethyl)-3-thiapentane, 1-(β-epithiopropylthio)-2,2-bis(β-epithiopropylthiomethyl)-4-thiahexane, 1,5,6-tris(β-epithiopropylthio)-4-(β-epithiopropylthiomethyl)-3-thiahexane, 1,8-bis(β-epithiopropylthio)-4-(β-epithiopropylthiomethyl)-3,6-dithiaoctane, 1,8-bis(β-epithiopropylthio)-4,5-bis(β-epithiopropylthiomethyl)-3,6-dithiaoctane, 1,8-bis(β-epithiopropylthio)-4,4-bis(β-epithiopropylthiomethyl)-3,6-dithiaoctane, 1,8-bis(β-epithiopropylthio)-2,4,5-tris(β-epithiopropylthiomethyl)-3,6-dithiaoctane, 1,8-bis(β-epithiopropylthio)-2,5-bis(β-epithiopropylthiomethyl)-3,6-dithiaoctane, 1,9-bis(β-epithiopropylthio)-5-(β-epithiopropylthiomethyl)-5-[(2-β-epithiopropylthioethyl)thiomethyl]-3,7-dithianonane, 1,10-bis(β-epithiopropylthio)-5,6-bis[(2-β-epithiopropylthioethyl)thio]-3,6,9-trithiaundecane, 1,11-bis(β-epithiopropylthio)-4,8-bis(β-epithiopropylthioethyl)-3,6,9-trithiaundecane, 1,11-bis(β-epithiopropylthio)-5,7-bis(β-epithiopropylthiomethyl)-3,6,9-trithiaundecane, 1,11-bis(β-epithiopropylthio)-5,7-[(2-β-epithiopropylthioethyl)-3,6,9-trithiaundecane, 1,11-bis(β-epithiopropylthio)-4,7-bis(β-epithiopropylthiomethyl)-3,6,9-trithiaundecane, 1,3-bis(β-epithiopropylthio)cyclohexane, 1,4-bis(β-epithiopropylthio)cyclohexane, 1,3-bis(β-epithiopropylthiomethyl)cyclohexane, 1,4-bis(β-epithiopropylthiomethyl)cyclohexane, bis[4-(β-epithiopropylthio)cyclohexyl]methane, 2,2-bis[4-(β-epithiopropylthio)cyclohexyl]propane, bis[4-(β-epithiopropylthio)cyclohexyl]sulfide, 2,5-bis(β-epithiopropylthiomethyl)-1,4-dithian, 2,5-bis(β-epithiopropylthioethylthiomethyl)-1,4-dithian, 1,3-bis(β-epithiopropylthio)benzene, 1,4-bis(β-epithiopropylthio)benzene, 1,3-bis(β-epithiopropylthiomethyl)benzene, 1,4-bis(β-epithiopropylthiomethyl)benzene, bis[4-(β-epithiopropylthio)phenyl]methane, 2,2-bis[4-(β-epithiopropylthio)phenyl]propane, bis[4-(β-epithiopropylthio)phenyl]sulfide, bis[4-(β-epithiopropylthio)phenyl]sulfone and 4,4'-bis(β-epithiopropylthio)biphenyl.

15. The resinous composition according to claim 14, wherein compound (b) is selected from the group consisting of methyl mercaptan, ethyl mercaptan, n-propyl mercaptan, n-butyl mercaptan, allyl mercaptan, n-hexyl mercaptan, n-octyl mercaptan, n-decyl mercaptan, n-dodecyl mercaptan, n-tetradecyl mercaptan, n-hexadecyl mercaptan, n-octadecyl mercaptan, cyclohexyl mercaptan, isopropyl mercaptan, tert-butyl mercaptan, tert-nonyl mercaptan, tert-dodecyl mercaptan, benzyl mercaptan, 4-chlorobenzyl mercaptan, methyl thioglycolate, ethyl thioglycolate, n-butyl thioglycolate, n-octyl thioglycolate, methyl(3-mercaptopropionate), ethyl(3-mercaptopropionate), 3-methoxybutyl(3-mercaptopropionate), n-butyl(3-mercaptopropionate), 2-ethylhexyl(3-mercaptopropionate) and n-octyl(3-mercaptopropionate), and polymercaptans such as methanedithiol, 1,2-dimercaptoethane, 1,2-dimercaptopropane, 2,2-dimercaptopropane, 1,3-dimercaptopropane, 1,2,3-trimercaptopropane, 1,4-dimercaptobutane, 1,6-dimercaptohexane, bis(2-mercaptoethyl)sulfide, 1,2-bis(2-mercaptoethylthio)ethane, 1,5-dimercapto-3-oxapentane, 1,8-dimercapto-3,6-dioxaoctane, 2,2-dimethylpropane-1,3-dithiol, 3,4-dimethoxybutane-1,2-dithiol, 2-mercaptomethyl-1,3-dimercaptopropane, 2-mercaptomethyl-1,4-dimercaptobutane, 2-(2-mercaptoethylthio)-1,3-dimercaptopropane, 1,2-bis(2-mercaptoethylthio)-3-mercaptopropane, 1,1,1-tris(mercaptomethyl)propane, tetrakis(mercaptomethyl)methane, ethylene glycol bis(2-mercaptoacetate), ethylene glycol bis(3-mercaptopropionate), 1,4-butanediolbis(2-mercaptoacetate), 1,4-butanediolbis(3-mercaptopropionate), trimethylolpropanetris(2-mercaptoacetate), trimethylolpropanetris(3-mercaptopropionate), pentaerythritoltetrakis(2-mercaptoacetate), pentaerythritoltetrakis(3-mercaptoacetate), 1,1-dimercaptocyclohexane, 1,4-dimercaptocyclohexane, 1,3-dimercaptocyclohexane, 1,2-dimercaptocyclohexane, 1,4-bis(mercaptomethyl)cyclohexane, 1,3-bis(mercaptomethyl)cyclohexane, 2,5-bis(mercaptomethyl)-1,4-dithian, 2,5-bis(2-mercaptoethyl)-1,4-dithian, 2,5-bis(mercaptomethyl)-1-thian, 2,5-bis(2-mercaptoethyl)-1-thian, 1,4-bis(mercaptotophenyl)sulfide, bis(4-mercaptophenyl)ether, 2,2-bis(4-mercaptophenyl)propane, bis(4-mercaptomethylphenyl)sulfide, bis(4-mercaptomethylphenyl)ether, 2,2-bis(4-mercaptomethylphenyl)propane, 2,5-dimercapto-1,3,4-thiadiazole, 3,4-thiophedithiol, allyl mercaptan, 2-vinylbenzyl mercaptan, 3-vinylbenzyl mercaptan, 4-vinylbenzyl mercaptan, 2-vinylthiophenol, 3-vinylthiophenol and 4-vinylthiophenol.

16. The resinous composition according to claim 1, wherein compound (a) is bis(β-epithiopropyl)sulfide; and compound (b) is selected from the group consisting of thiophenol, ethyl thioglycolate, ethyl(3-mercaptopropionate), bis(2-mercaptoethyl)sulfide, 2,5-dimercaptomethyl-1,4-dithian, 2-(2-mercaptoethylthio)-1,3-dimercaptopropane, 1,2-bis(2-mercaptoethylthio)-3-mercapto propane and n-butyl thioglycolate.

17. The resinous composition according to claim 1, wherein compound (a) is selected from the group consisting of 1,2-bis(β-epithiopropylthio)ethane and bis[2-(β-epithiopropylthio)ethyl]sulfide; and compound (b) is thiophenol.

* * * * *